(12) United States Patent
Weiser et al.

(10) Patent No.: US 11,387,702 B2
(45) Date of Patent: Jul. 12, 2022

(54) STATOR DEVICE WITH INTERCONNECTION END DISK FOR AN ELECTRIC MOTOR AND USE OF THE STATOR DEVICE

(71) Applicant: ebm-papst St. Georgen GmbH & Co. KG, St. Georgen (DE)

(72) Inventors: Thirza Weiser, Schiltach (DE); Christian Rudel, Königsfeld (DE); Achim Honold, Vöhrenbach (DE); Hassan Ghodsi-Khameneh, Offenburg (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 185 days.

(21) Appl. No.: 16/963,676

(22) PCT Filed: Jan. 7, 2019

(86) PCT No.: PCT/EP2019/050264
§ 371 (c)(1),
(2) Date: Jul. 21, 2020

(87) PCT Pub. No.: WO2019/149475
PCT Pub. Date: Aug. 8, 2019

(65) Prior Publication Data
US 2021/0075290 A1   Mar. 11, 2021

(30) Foreign Application Priority Data
Jan. 30, 2018 (DE) ..................... 10 2018 102 033.3

(51) Int. Cl.
*H02K 3/52* (2006.01)

(52) U.S. Cl.
CPC ......... *H02K 3/522* (2013.01); *H02K 2203/09* (2013.01)

(58) Field of Classification Search
CPC .......................... H02K 2203/09; H02K 3/522
See application file for complete search history.

(56) References Cited

U.S. PATENT DOCUMENTS

| 8,154,163 B2* | 4/2012 | Inoue ..................... H02K 3/522 |
| | | 310/71 |
| 8,217,541 B2* | 7/2012 | Sugiyama ................ H02K 3/50 |
| | | 310/260 |

(Continued)

FOREIGN PATENT DOCUMENTS

| DE | 102008033604 A1 | 1/2010 |
| DE | 102014115379 A1 | 4/2016 |

(Continued)

OTHER PUBLICATIONS

International Search Report and Written Opinion of the International Searching Authority, issued in PCTEP2019/050264, dated Feb. 28, 2019; ISA/EP.

*Primary Examiner* — Robert W Horn
(74) *Attorney, Agent, or Firm* — Harness, Dickey & Pierce, P.L.C.

(57) ABSTRACT

A stator device with a plurality of windings, on a winding carrier, that electromotive interaction with a rotor. The windings are parallel to one another and to the center axis. The windings can be individually electrically contacted with winding terminals of a winding wire. The windings are assigned to at least two disk-shaped and/or ring-shaped electrically conductive interconnection rings so that they are electrically insulated from one another. The winding terminals are connected using the interconnection ring assigned to this terminal polarity (U; V; W) for external permanent common contact by welding hooks formed on the radial inner side on the interconnection ring. A ring-shaped deflec- (Continued)

tion disk, with deflection pins, is provided in the axial direction on the interconnection end disk.

9 Claims, 4 Drawing Sheets

(56) References Cited

U.S. PATENT DOCUMENTS

| | | | |
|---|---|---|---|
| 9,225,217 B2* | 12/2015 | Tomita | H02K 3/522 |
| 9,331,539 B2* | 5/2016 | Arai | H02K 15/00 |
| 9,484,782 B2* | 11/2016 | Arai | H02K 3/522 |
| 9,742,236 B2* | 8/2017 | Kim | H02K 3/522 |
| 9,871,422 B2* | 1/2018 | Kim | H02K 3/522 |
| 10,236,116 B2* | 3/2019 | Kim | H01F 27/325 |
| 2005/0088049 A1 | 4/2005 | De Filippis et al. | |
| 2009/0200879 A1 | 8/2009 | Ghodsi-Khameneh et al. | |
| 2011/0115317 A1 | 5/2011 | Stark et al. | |
| 2011/0187226 A1* | 8/2011 | Sagara | H02K 3/522 |
| | | | 310/254.1 |
| 2020/0028400 A1* | 1/2020 | Seo | H02K 15/10 |
| 2021/0044180 A1* | 2/2021 | Seo | H02K 11/25 |
| 2021/0057957 A1* | 2/2021 | Hwang | H02K 3/50 |
| 2021/0066988 A1* | 3/2021 | Leroy | H02K 3/28 |
| 2021/0075290 A1* | 3/2021 | Weiser | H02K 3/522 |
| 2021/0288544 A1* | 9/2021 | Wang | H02K 3/38 |
| 2021/0367459 A1* | 11/2021 | Gervais | H02K 3/522 |
| 2022/0014065 A1* | 1/2022 | Seo | H02K 3/50 |
| 2022/0029501 A1* | 1/2022 | Kim | H02K 5/225 |

FOREIGN PATENT DOCUMENTS

| | | |
|---|---|---|
| EP | 1526628 A1 | 4/2005 |
| EP | 2091132 A2 | 8/2009 |
| WO | WO-2007048566 A1 | 5/2007 |
| WO | WO-2011151692 A2 | 12/2011 |

* cited by examiner

STATOR DEVICE WITH INTERCONNECTION END DISK FOR AN ELECTRIC MOTOR AND USE OF THE STATOR DEVICE

CROSS-REFERENCE TO RELATED APPLICATIONS

This application is a National Stage of International Application No. PCT/EP2019/050264, filed Jan. 7, 2019, and published in German as WO 2019/149475 on Aug. 8, 2019. This application claims priority to German Patent Application No. 10 2018 102 033.3, filed Jan. 30, 2018. The entire disclosures of the above applications are incorporated herein by reference.

The present disclosure relates to a stator device for an electric motor and, more particularly to a use of such a stator device.

Generic stator devices are generally known from the prior art. They comprise a winding carrier, at or on which a plurality of stator windings are seated and wound using suitable winding wire. Depending on the implementation principle of the electric motor implemented using such a stator device, these windings are interconnected and/or wired in a suitable manner. Thus this is known as a typical use of such a generic stator device. The stator device has the windings configured and wired for generating an electrical rotary field. The field interacts with a suitable rotor, as an external rotor or internal rotor, rotatably mounted around the center axis.

A typical implementation of a stator device for generating a three-phase rotary field for implementing a three-phase motor requires, for example, the interconnection of the windings in a star connection (Y connection), alternatively in a delta connection, again alternatively in mixed forms of these generic connection topologies. In particular, multiple windings are typically arranged periodically offset in relation to one another in the circumferential direction. Thus, they can be connected in parallel to one another in a typical three-phase system.

It is presumed to be known from the prior art, in this case, that the free wire ends, typically implemented having the winding terminals, are led out separately. The windings are designed to be contactable and are interconnected, via connection and/or terminal arrangements, to ensure a respective correct operating current supply of the overall arrangement in the scope of the desired topology and, for example, to effectuate parallel circuits. In particular, in stator devices having a larger number of individual windings, for example, twelve or more each individually contactable windings on a winding carrier are not unusual. However, an electrically and mechanically complex terminal formation results. It is not only complex to produce, for example, for the purposes of mechanized and/or automated manufacturing, but rather moreover has installation-space-related disadvantages and disadvantages with regard to operating conditions at the risk of malfunction and failure.

First suitable terminal and/or carrier bodies are voluminous, difficult to handle automatically, in particular, also during the actual (permanent) establishment of an electrical contact. The terminal and/or carrier bodies are also problematic in the fixation in the frame of a housing structure to be associated with a respective motor. Thus, in the case of the described plurality of windings and the terminal and interconnection problems, significant additional installation space is required for the arrangement. Particularly in a frontal-axial direction in relation to the winding carrier. This has a disadvantageous effect on the spectrum of use and the areas of use of such a device. In addition, there is the circumstance that in general, contacting, even of suitable contacts or node points, is not possible without the occurrence of intersection points or crossings of the wire ends to the respective windings. The possible disadvantage is that, the risk of abrasion points or other defects arises for example, in usage environments that are thermally stressed or stressed with vibration. This can cause undesired short-circuits. Other defects, that can result in such flaws in the case of overlapping wires or wire ends are, for example, unavoidable housing contacts, in particular in constricted installation spaces. Thus, the risk arises of friction-related or shaking-related damage of the type described.

Automation is moreover practically impossible, in particular in complex interconnections of the described plurality of windings. Not only is complex manual work required in the assembly, but rather this also frequently results in incorrect assembly compared to fully automated production processes. Thus, this creates inefficiency in manufacturing.

Finally, the disadvantage of known technologies, with respect to a respective one of the windings, is that effective wire lengths for a supply line are generally inhomogeneous. This is due to the complex interconnection and connection nodes. Also, unequal relationships in relation to one another exist with respective windings with respect to line lengths. This can result, for example, in certain motor technologies in differences in effective line resistances, inductances, and other effects. This is disadvantageously expressed in operation of a motor and is implemented in the form of vibrations or fluctuations in the torque.

A solution is known from DE 10 2014 115 379 A1. Here, the windings of equal terminal polarity are each connected to one another by a terminal assembly (interconnection ring).

In this case, the interconnection rings are designed so that the winding terminals of the winding can be contacted by contact sections (welding hooks) on the circumferential inner circumference of the respective interconnection ring. The contacting is preferably permanent and is executed, for example, by process-known welding methods. This occurs by using typical welding guns or similar automation or alternatively a contact-forming connection can be produced by soldering or crimping.

A space-saving installation option for the stator arrangement, in its entirety, is provided by this constructive design. However, it has proven to be disadvantageous in that the resulting structural space for the contact sections, in particular if they are embodied as welding hooks, is very limited. Moreover, a reduction of the interconnection effort could be achieved by the interconnection rings. However, the assembly of the stator unit still requires a high manufacturing expenditure due to of the variety of the individual components.

SUMMARY

It is the object of the present disclosure to improve a stator device for an electric motor with regard to assembly and manufacturing capability and provide higher product quality.

This object is achieved by the interconnection rings integrated into a hollow-cylindrical interconnection end disk. A ring-shaped deflection disk, with deflection pins, is arranged circumferentially distributed on the inner side of the deflection disk for deflecting the winding wire. It is provided in the axial direction on the interconnection end disk. Advantageous refinements of the disclosure are described in the dependent claims.

The integration of the interconnection rings into a hollow-cylindrical interconnection end disk results in a compact structural unit. Thus, it may be joined in a simply manufactured manner with further assemblies such as the winding carrier. In addition, the disclosure also enables a separation of the three phases or a number thereof.

According to the disclosure, a ring-shaped deflection disk is provided in the axial direction on the interconnection end disk. Its inner side includes circumferential distributed deflection pins to deflect the winding.

The stator arrangement has thus been supplemented according to the disclosure by a separate deflection disk. It concentrically abuts the interconnection end disk on its side facing away from the winding carrier.

The space requirement (structural height) necessary in the axial direction thus does increase. However, now sufficient structural space is available for the welding pins. The welding pins are formed on the inner side on the interconnection rings and partially protruding upward beyond the interior of the interconnection end disk.

The deflection pins are arranged circumferentially distributed on the inner side of the deflection disk. The pins enable a deflection of the winding wire in such a manner that it can be guided accurately through an opening of the welding hooks without high winding tension. The tension relief of the winding wire, thus effectuated, and the mechanical relief of the welding points on the welding hooks represent a further advantage with regard to increased manufacturing quality.

In a further advantageous design, the interconnection rings are integrated in a stacked manner in the interconnection end disk. Thus, the winding terminals of a winding, are guided at least sectionally in parallel to the center axis and/or without crossing. Each winding reaches a welding hook formed on the radial inner side on two of the interconnection rings.

In this manner, solely the provision of a number of (planar) interconnection rings in accordance with the required phase number or pole number, is firstly axially positioned in a space-saving manner. In the case, due to the preferred contacting of the welding hooks on the radial inner side, the geometrical requirements for the respective winding wires are provided. Thus, they extend in parallel to one another and in parallel to the center axis. Thus, no crossings or mechanical contacts take place, that result in flaws and/or in bare points and short-circuits linked between the phases or to ground.

The present disclosure links high operational reliability with simple and reliable manufacturing ability. Thus, the welding hooks on the radial inner side can be reached using automation tools, for example, a welding gun.

A further advantage of the design according to the disclosure is enhanced flexibility with respect to the adaptation to electrical engineering requirements and manufacturing ability. The number of produced contact connections is solely determined by the number of windings. In the preferred application, they are seated so they can be easily configured on the winding carrier. This occurs, either by suitable design of a respective winding carrier, or alternatively by only partial or suitable winding of a winding carrier with the desired number of windings. Thus, it can be suitably adapted for a respective intended use.

In one preferred design, the deflection pins face, in the axial direction, can be aligned axially flush with intermediate spaces of the welding hooks. Thus, the winding wire can be guided via the deflection pins.

The winding wires can advantageously be guided with tension relief via the deflection pins and without crossings in relation to one another in parallel to the respective welding hooks of the interconnection rings. The winding wires contact the welding hooks. Thus, the contact reliability is ensured in every configuration with simple manufacturing capability.

Furthermore, the interconnection rings are embodied as stamped parts. The interconnection end disk is embodied as an injection-molded component. It has extrusion-coated interconnection rings.

The design of the interconnection rings, as stamped parts, simplifies the production process. Also, it permits the integration thereof without problems by extrusion coating, so that the interconnection end disk with the embedded interconnection rings, can be produced cost-effectively as a compact injection-molded part in large piece counts. The three stamped parts of the interconnection rings can be used as identical parts and emphasize a cost-optimized approach.

The welding hooks integrally formed on the interconnection rings, of axially adjacent interconnection rings are preferably arranged offset and/or protrude offset along a circumferential direction.

In particular in multiphase arrangements, for example, three terminal rings are used in the case of a three-phase stator. Thus, it is preferable to design the arrangement of the welding hooks of the interconnection rings so that these welding hooks are offset in relation to one another along the circumferential direction. Such an arrangement reduces, in particular upon the use having a plurality of, for example, twelve or more windings, the risk of inadvertent contacts between winding wires of various phases. Also, it additionally simplifies the automated contacting, for example, by engagement of a welding gun.

As a result, a stator device arises by way of the present disclosure that is suitable for arbitrary uses, phase numbers and pole numbers, and winding numbers, but in particular in the case of more than six, preferably more than nine, or even more than twelve windings, has significant advantages in the problem context described at the outset. Therefore, the present disclosure is favorably suitable for applications of automotive engineering or manufacturing technology, where mechanically or thermally stressed environmental conditions are frequently to be expected. However, the disclosure is not restricted to this usage content and application. The present disclosure is also independent in principle of an implementation of the stator device according to the invention for a rotor implementation as an internal rotor or external rotor.

From the following further advantages, features, and details of the disclosure result from the following description of preferred exemplary embodiments and on the basis of the drawings; in the figures:

DRAWINGS

The drawings described herein are for illustrative purposes only of selected embodiments and not all possible implementations, and are not intended to limit the scope of the present disclosure.

DETAILED DESCRIPTION

Figure 1:
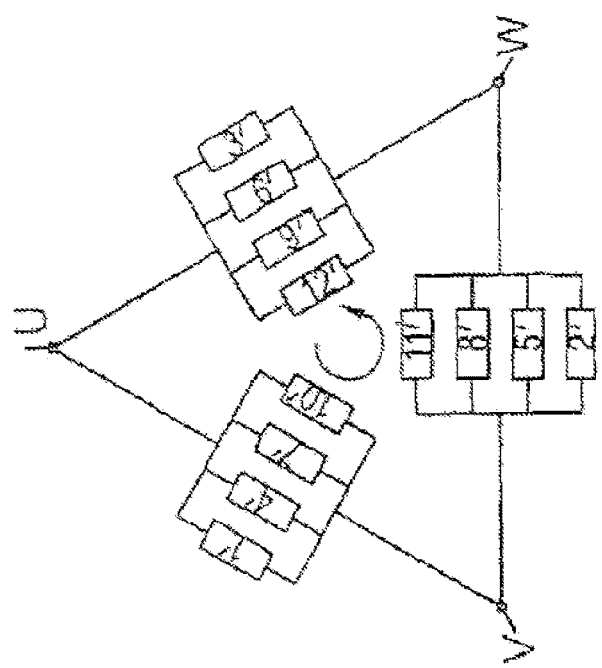
FIG. 1 is a schematic circuit diagram illustrating the interconnection of the windings in the exemplary embodiment of FIG. 3 as a delta connection with four parallel windings in each case.
Figure 2:
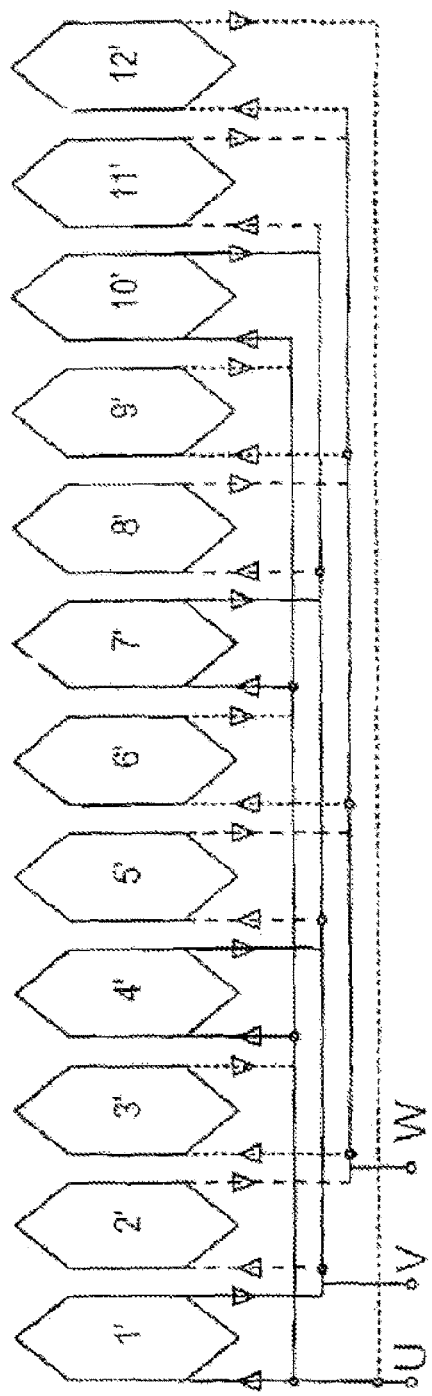
FIG. 2 is a schematic view of a terminal and winding scheme for the windings according to FIG. 1.

FIG. 1 and FIG. 2 illustrate a circuit diagram with a three-phase rotary field having the phases (terminal polarities) U, V, W applied to the windings 1' to 12'. In the manner shown in FIG. 1 and FIG. 2, each four of the windings 1' to 12' form one branch of the delta connection shown in a parallel circuit. The windings 1' to 12' are interleaved along the circumferential direction of a winding carrier 4 (FIG. 3) in accordance with their numbering in the circumferential direction.

Figure 3:
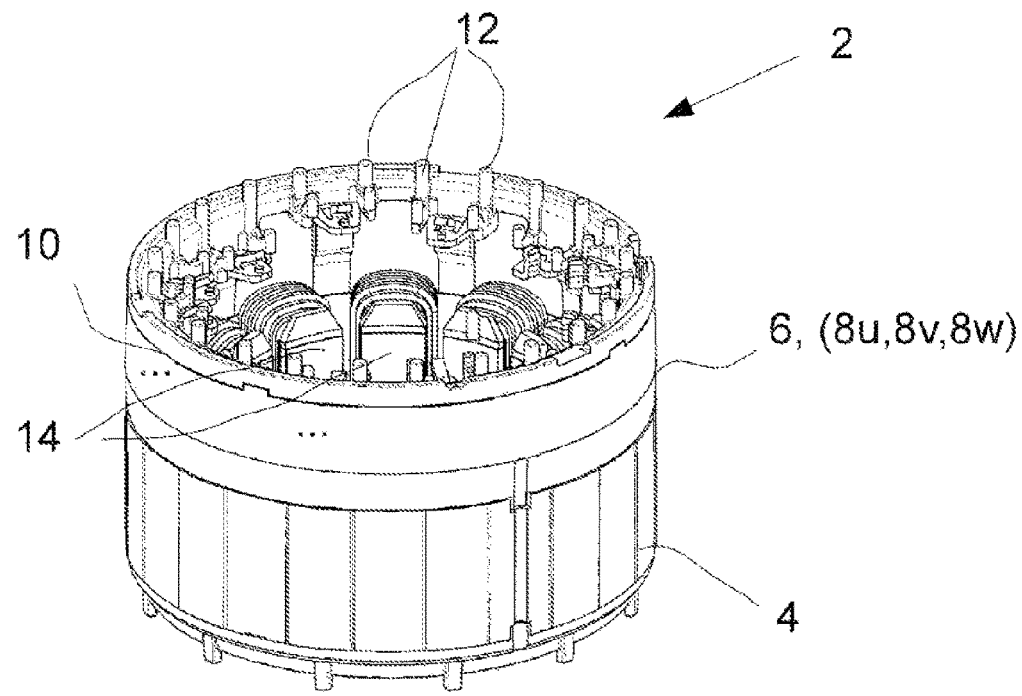
FIG. 3 is a a perspective view of a stator device according to a first exemplary embodiment of the disclosure in a 12-pole design for an internal rotor.

A stator device 2 according to the disclosure is shown in a perspective view in FIG. 3. It is a 12-pole design for an internal rotor according to a first preferred exemplary embodiment of the present disclosure.

The stator device 2 includes, as essential assemblies, a winding carrier 4 accommodates the windings 1' to 12'. The interconnection end disk 6 has an interconnection end disk 6 and a deflection disk 10. The winding carrier has extrusion-coated embedded interconnection rings 8u, 8v, 8w. The deflection disk 10 has formed-on deflection pins 12.

The twelve windings 1' to 12' are arranged in a circular shape on the jacket-side cylindrical winding carrier 4. This implements the illustrated 12-pole stator device. The windings 1' to 12' are each provided on a stator or yoke plate arrangement (not shown in detail, presumed to be generally known). Pole shoes 14 are located inward from each winding 1' to 12' for interaction with an internal rotor (not shown). The rotor is rotatably mounted around an axis of rotation. The axis of rotation corresponds to the center axis or (rotational) axis of symmetry of the device according to FIG. 3.

Figure 4:
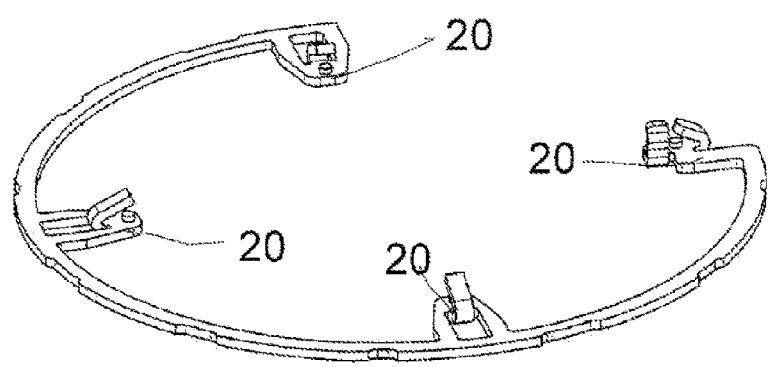
FIG. 4 is a a perspective view of an interconnection ring with formed-on welding hooks.

FIG. 4 is a perspective view of an interconnection ring 8u, 8v, 8w with molded-on welding hooks 20. The interconnection rings 8u, 8v, 8w comprises four welding hooks 20. The four winding terminals of equal terminal polarity U, V, W of the windings 1' to 12' are connected to the hooks twice to one another. Therefore, one interconnection ring 8u, 8v, 8w is provided for each of the terminal polarities U, V, W (phases of the three-phase power supply system).

The welding hooks 20 extend like forks in a radial direction toward the axis of rotation. The welding hooks 30 enable axial leading of the winding terminals and permanent contacting by welding.

The winding wire are inserted and/or protrude into an open region of one of the welding hooks 20. Thus, they can be electrically contacted and permanently connected by welding by electrodes of a welding gun engaging on the inner side in the stator arrangement.

Figure 5:
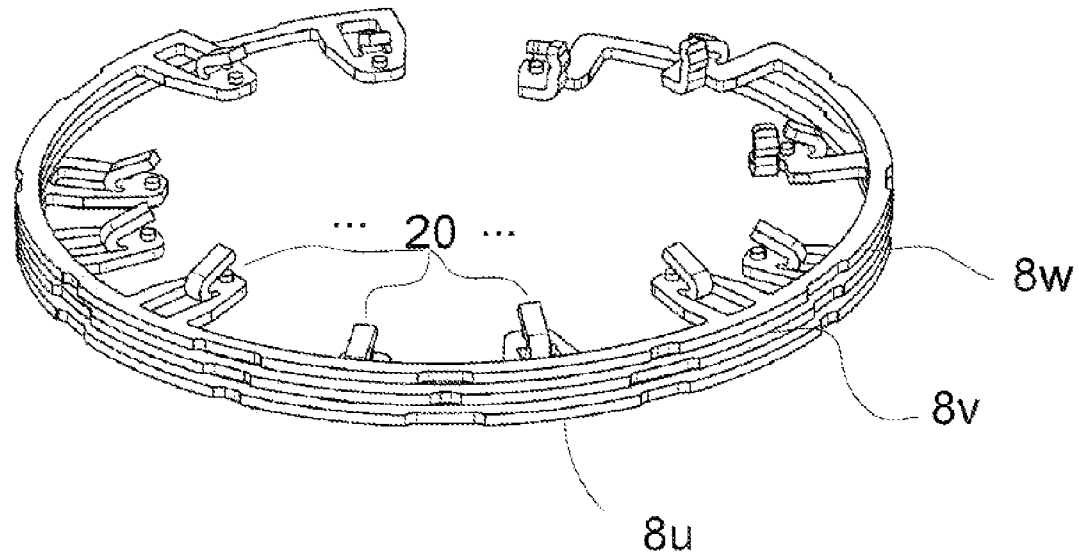
FIG. 5 is a perspective view of a stacked arrangement of three interconnection rings.

FIG. 5 is a perspective view of a stacked arrangement of three interconnection rings 8u, 8v, 8w. The offset arrangement in the circumferential direction of the concentrically stacked interconnection rings 8u, 8v, 8w can be seen. This results in a circumferentially equidistant distribution of the welding hooks 20 formed on the interconnection rings 8u, 8v, 8w. The arrangement thus simultaneously implements, in addition to a reliable, securely contacted, and in particular crossing-free contacting, the interleaved electrical parallel circuit shown in FIG. 1 and FIG. 2.

Figure 6:
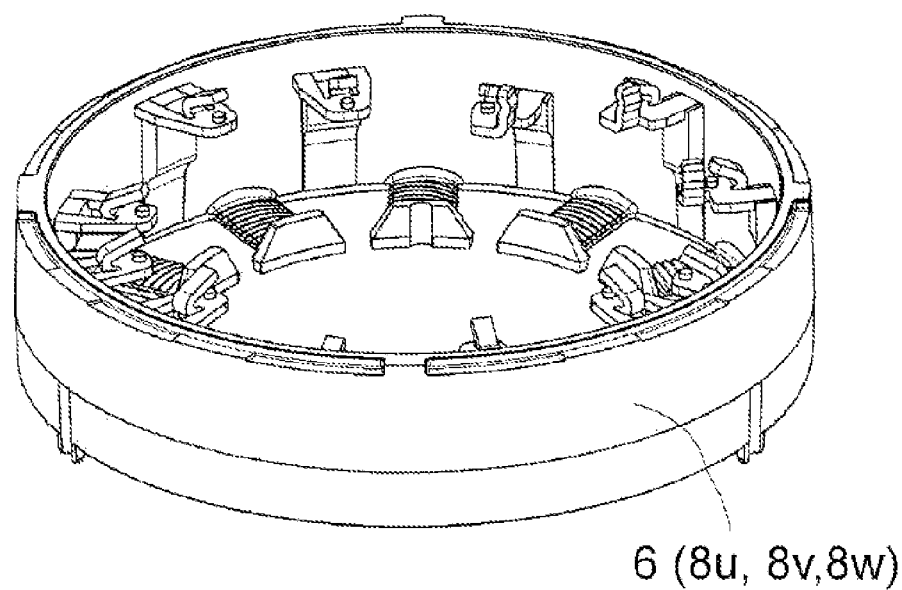
FIG. 6 is a perspective view of the interconnection end disk with integrated, extrusion-coated interconnection rings.

A perspective view of the interconnection end disk 6 with integrated, extrusion-coated interconnection rings 8u, 8v, 8w is shown in FIG. 6. By extrusion coating of the interconnection rings 8u, 8v, 8w, that are preferably formed as stamped parts, the interconnection end disk 6 is implemented as an injection-molded component. The interconnection rings 8u, 8v, 8w, in a stacked arrangement, are embedded twist-locked and fixed in the axial direction in the interconnection end disk 6.

Figure 7:
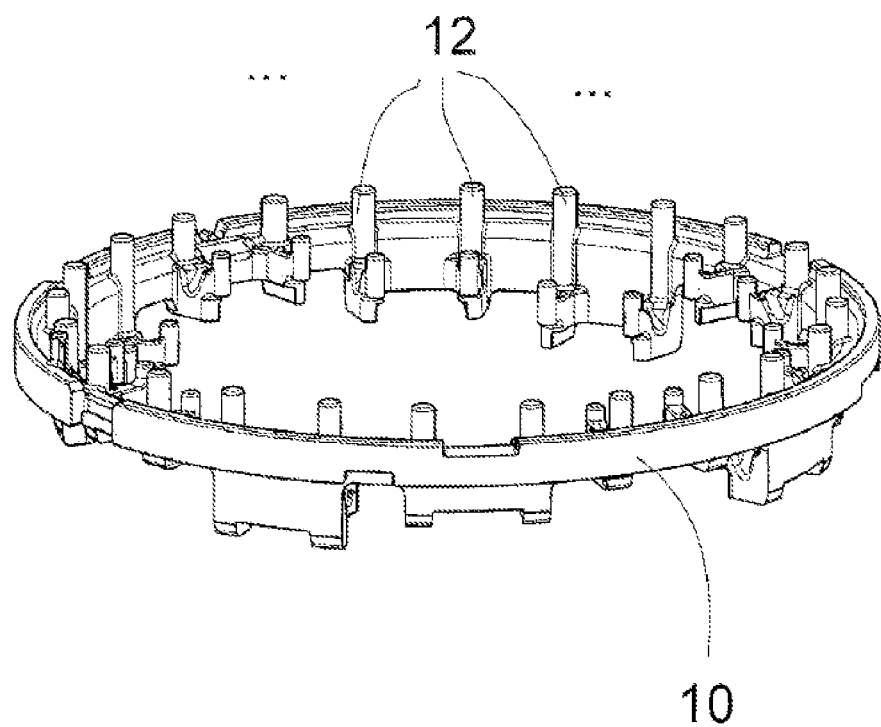
FIG. 7 is a perspective view of the deflection disk.

FIG. 7 shows a deflection disk 10 in a perspective view. The deflection disk 10 has a diameter on its outer jacket that is flush with the outer jacket section of the winding carrier 6. The deflection disk 10 has deflection pins 12 circumferentially distributed on its internal diameter. The number and alignment of the deflection pins 12 is dimensioned, in the present example, so that one deflection pin 12 comes to rest in the circumferential direction directly on the right and left adjacent to one welding hook 20 (FIG. 3). The deflection disk 10 thus has a total of 24 deflection pins 12, via which the winding wires can be guided with substantial tension relief.

A stator device could be provided by the present disclosure, using which, due to the integration of the interconnection rings into an interconnection end disk, on the one hand, the assembly and manufacturing ability would be simplified. Also, the product quality could be increased by the separate deflection disk for deflecting the winding wires.

In this case, the present disclosure is not restricted to the exemplary embodiment shown of a 12-pole stator for internal rotors. Rather both the number of the windings and also the interconnection (for example, also star-shaped, having other parallel circuits, or having a completely different assignment, that is also individually externally activated) can be implemented. The present disclosure can also be similarly suitable for external rotors. Thus, the respective arrangement and assignment of the welding hooks would take place on the radial outer side.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A stator device for an electric motor comprising
a plurality of windings provided on a winding carrier, the plurality of windings formed for electromotive interaction with a rotor rotatably mounted around a center axis in relation to the winding carrier, the plurality of windings extend parallel to one another and to the center axis, and are arranged along a profile in the form of a circular arc,
the plurality of windings are formed so they can be individually electrically contacted with winding terminals of a winding wire;

the windings are assigned to at least two disk-shaped and/or ring-shaped electrically conductive interconnection rings in such a way that the windings are electrically insulated from one another, and are arranged along an axial direction of the center axis on the winding carrier;

the winding terminals, with the same electrical terminal polarity (U; V; W) of the windings, are detachably connected using the interconnection ring assigned to the terminal polarity (U; V; W) for external permanent common contacting by welding hooks formed on the radial inner side on the interconnection ring, the interconnection rings are integrated into a hollow-cylindrical interconnection end disk;

a ring-shaped deflection disk provided in the axial direction on the interconnection end disk, the ring-shaped deflection disk including deflection pins arranged circumferentially distributed on an inner side of the deflection disk for deflecting the winding wire, is provided in the axial direction on the interconnection end disk.

2. The stator device as claimed in claim 1, wherein the interconnection rings are integrated in a stacked manner in the interconnection end disk in such a way that the winding terminals of the windings are guided at least sectionally parallel to the center axis and/or without crossing, each winding reaches the welding hook formed on the radial inner side on two of the interconnection rings.

3. The stator device as claimed in claim 1, wherein the deflection pins face, in the axial direction, and can be aligned axially flush with intermediate spaces of the welding hooks, so that the winding wire can be guided via the deflection pins.

4. The stator device as claimed in claim 1, wherein the interconnection rings are embodied, as stamped parts, and the interconnection end disk is embodied as an injection-molded component having extrusion-coated interconnection rings.

5. The stator device as claimed in claim 1, wherein the welding hooks, integrally formed on the interconnection rings of axially adjacent interconnection rings are arranged offset and/or protrude offset along a circumferential direction.

6. The stator device as claimed in claim 1, wherein the interconnection end disk is formed on the jacket side so that it aligns along a circumferential direction at least sectionally with an outer jacket section of the winding carrier.

7. The stator device as claimed in claim 1, wherein the interconnection end disk comprises axially terminal plug contacts for external electrical contacting of each one of the interconnection rings.

8. A use of the stator device as in claim 1 for at least six, preferably at least nine, more preferably at least twelve stator windings as the windings in an internal or external rotor motor.

9. The use as claimed in claim 8 wherein the stator windings that are interconnected in a delta connection with three terminal polarities (U; V; W), are connected to three circumferential interconnection rings in such a way that the stator windings associated with one branch of the delta connection are each connected in parallel to one another by action of the interconnection rings.

* * * * *